May 8, 1956 W. G. CORSON 2,744,290
APPARATUS FOR APPLYING TREAD RUBBER TO TIRE CARCASSES
Filed April 9, 1951 4 Sheets-Sheet 1

INVENTOR.
William G. Corson
BY
William Cleland
Attorney

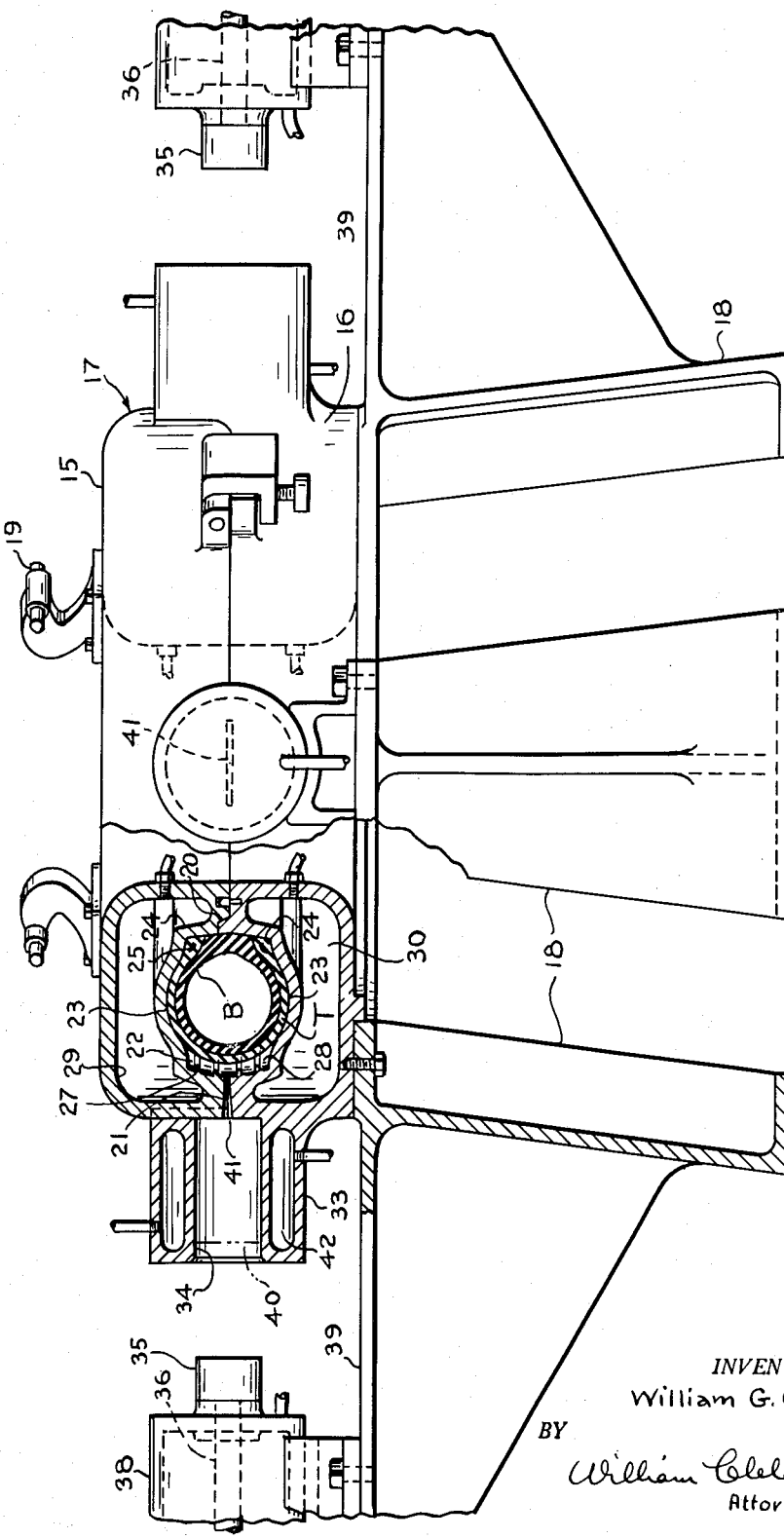

May 8, 1956 W. G. CORSON 2,744,290
APPARATUS FOR APPLYING TREAD RUBBER TO TIRE CARCASSES
Filed April 9, 1951 4 Sheets-Sheet 3
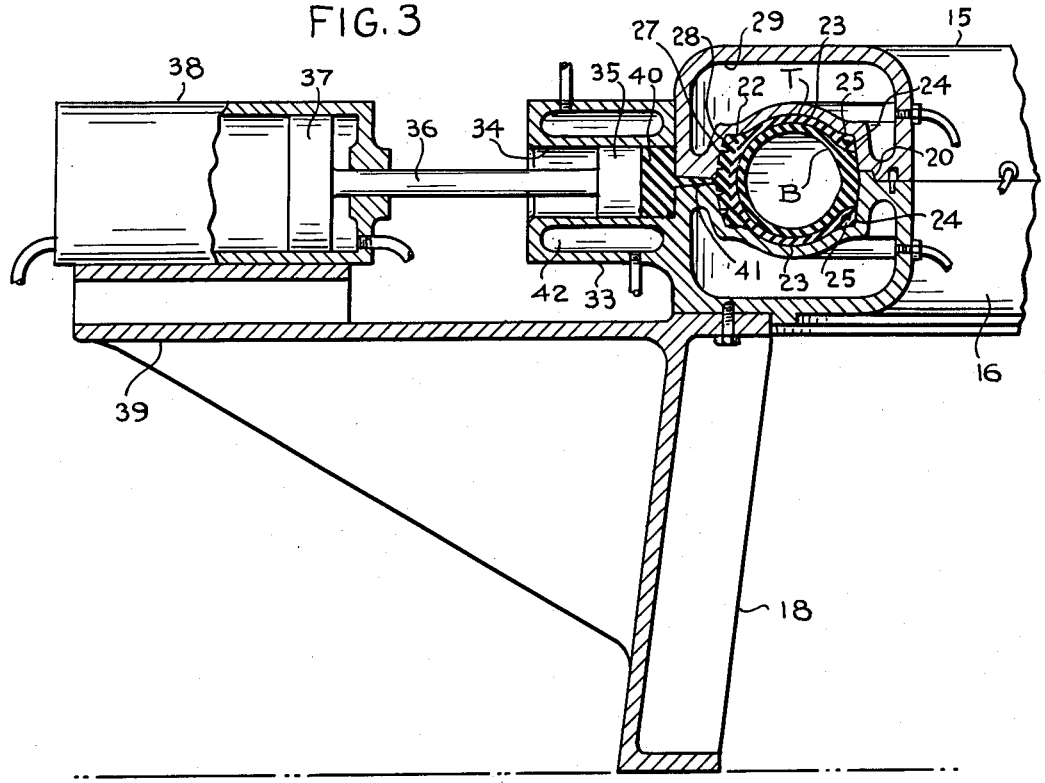
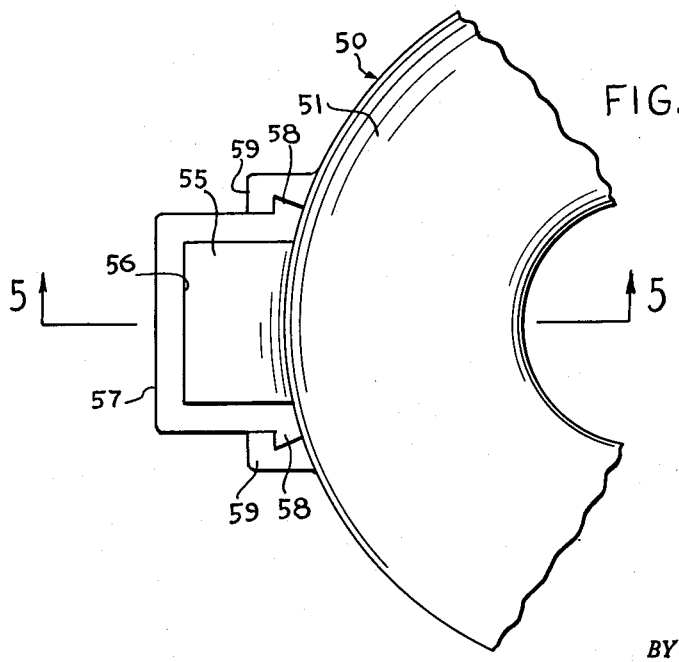
INVENTOR.
William G. Corson
BY
William Cleland
Attorney May 8, 1956 W. G. CORSON 2,744,290
APPARATUS FOR APPLYING TREAD RUBBER TO TIRE CARCASSES
Filed April 9, 1951 4 Sheets-Sheet 4
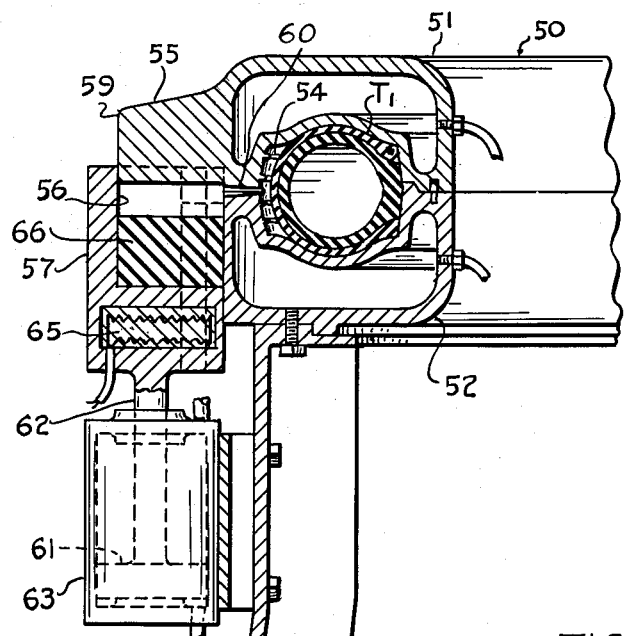
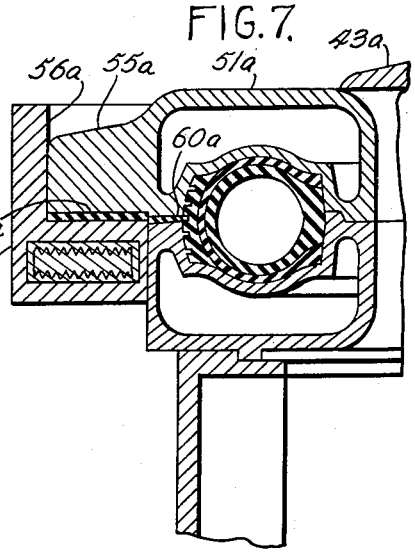
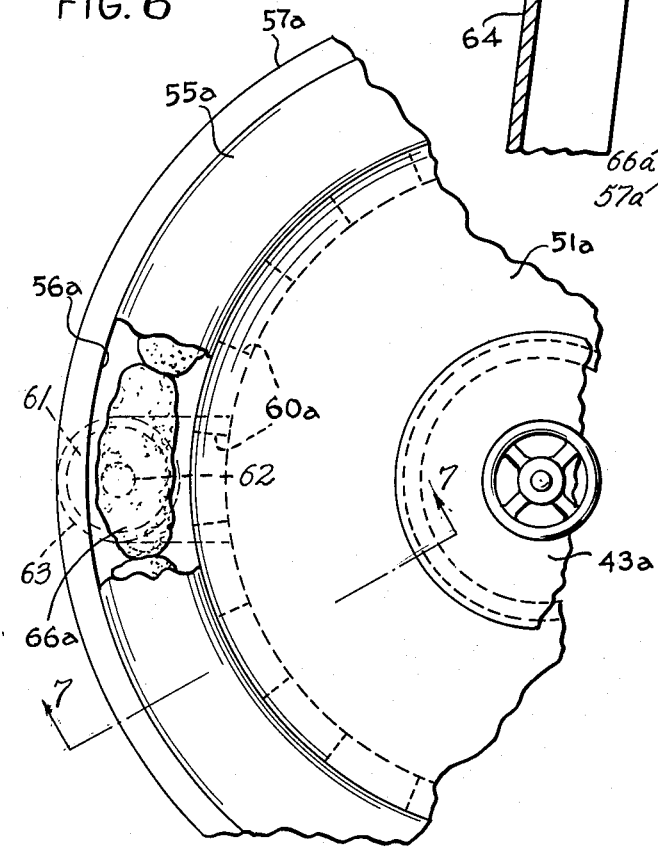
INVENTOR.
William G. Corson
BY
William Cleland
Attorney

United States Patent Office 2,744,290
Patented May 8, 1956

2,744,290

APPARATUS FOR APPLYING TREAD RUBBER TO TIRE CARCASSES

William G. Corson, Akron, Ohio

Application April 9, 1951, Serial No. 220,024

12 Claims. (Cl. 18—30)

This invention relates to vulcanizing equipment, and in particular relates to apparatus for applying and vulcanizing tread rubber to new or old pneumatic tire casings.

Heretofore, pneumatic tires have been retreaded or recapped, for example, by first applying a band of unvulcanized rubber stock to the usual tire casing, after reduction of the old tread stock, as by buffing, and then vulcanizing the tread to the tire in a retreading vulcanizer of known type. This method has been unsatisfactory because of the difficulty of applying the correct amount of rubber stock to the tire to fill the mold cavity, or because non-uniform buffing may cause non-uniform distribution of the rubber, resulting in an unbalanced tire which does not wear uniformly. Moreover, such methods have required certain expensive equipment in addition to the vulcanizer, such as extrusion machines or cutters for providing the tread stock or "camel-back" in shaped or precut lengths, rotary building drums for mounting the tires for application of the tread stock, tread stitching tools, etc.

One object of the present invention is to provide a unitary vulcanizing mold, particularly adaptable for treading new tires, or for retreading or recapping pneumatic tires, whereby is eliminated the usual necessity of providing pre-cut or extruded tread stock of various sizes and shapes, rubber extrusion machines for the same, tire building drums, and stitching or other tools ordinarily used for applying tread stock, with a consequent economical reduction in space required for the equipment and in the labor required to operate the same.

Another object of the invention is to provide apparatus of the character described which is self-operating to provide and apply requisite amounts of tread stock, regardless of any unevenness which might be present on the tire carcasses as a result of non-uniform buffing or other preparation.

Other objects of the invention will be manifest from the following brief description and the accompanying drawings.

Of the accompanying drawings:

Figure 2 is an enlarged front elevation thereof, partly broken away and in section.

Figure 3 is a fragmentary cross-section, on the same scale, taken substantially on the line 3—3 of Figure 1.

Figure 4 is a fragmentary top plan view, on a larger scale than Figure 1, illustrating a modified form of tire retreading vulcanizer.

Figure 5 is a vertical cross-section taken substantially on the line 5—5 of Figure 4.

Figure 6 is a top plan view, partly broken away, on the same scale as Figure 4, of another modified form of the invention.

Figure 7 is a cross-section taken substantially on the line 7—7 of Figure 6.

Figure 1:
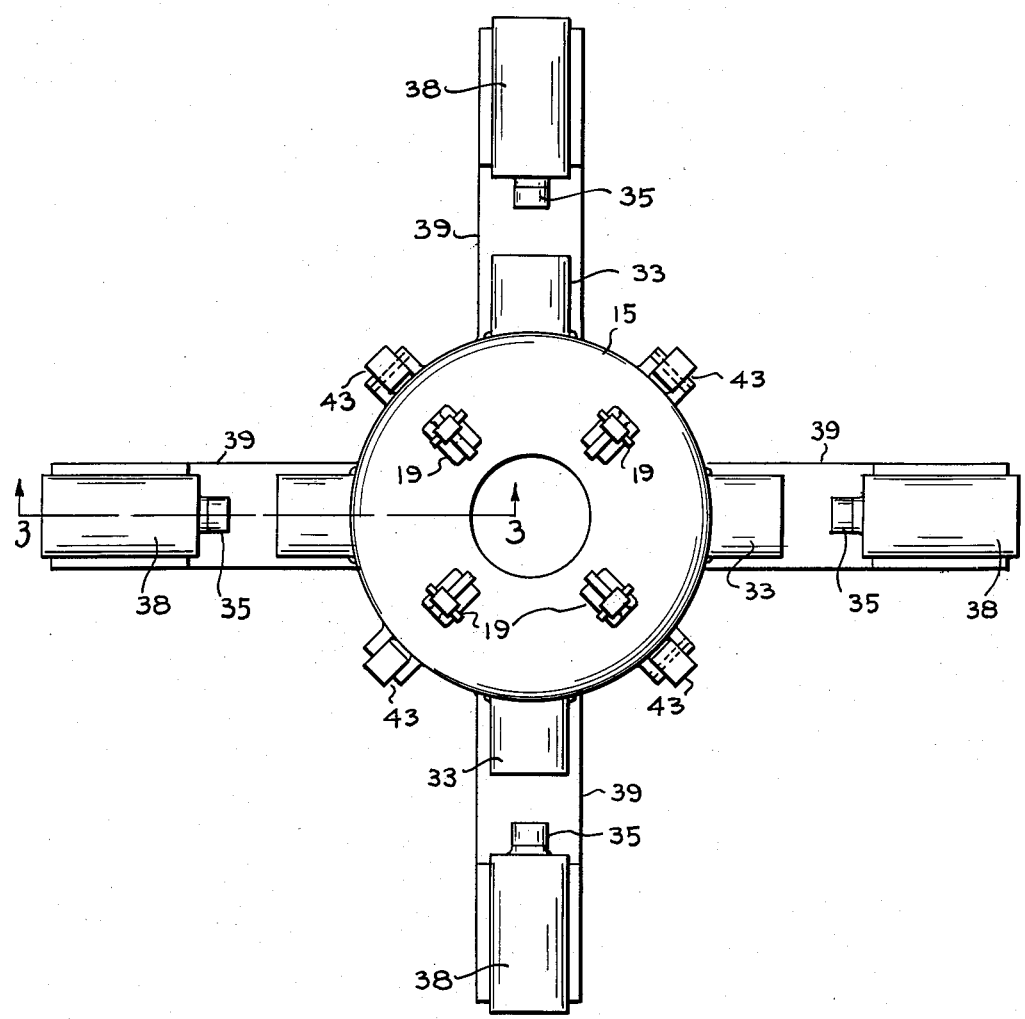
Figure 1 is a top plan view of one form of a tire retreading vulcanizer embodying the features of the invention.

Referring first to the embodiment of the invention shown in Figures 1, 2 and 3, the numerals 15 and 16 indicate relatively fixed and relatively movable top and bottom mold sections, respectively, of a sectional cavity mold 17, the bottom section being bolted or otherwise mounted horizontally on a suitable supporting frame 18. The top section 15 is provided with lifting brackets 19 for attachment of suitable lifting hooks of a lifting device (not shown), whereby it may be moved from and toward registry with bottom section 16 at annular inner and outer registering portions 20 and 21, respectively. The mold sections have mating half cavity portions defining a mold cavity 22 including opposite sidewall portions 23, 23, annular seats 24, 24 for positive centering reception of the usual beads 25 of a tire casing 26, and an annular non-skid tread forming portion 27. An annular space 28 is shown between said tread portion of the mold and the casing, from which the old tread rubber removed as by buffing or grinding. Vulcanizing heat is applied to the mold in known manner, as by circulation of steam to chambers 29 and 30 in the mold sections 15 and 16.

The present invention contemplates injection of rubber or like plastic tread stock into said annular space 28. To this end the bottom mold section 16 may have integral with the outer peripheral wall thereof a series of circumferentially spaced cylinders 33, 33 (four being shown) the axes of which extend radially in a horizontal plane centrally through the mold. A bore 34 of each cylinder opens radially outwardly for reception of a plunger 35 on a shaft 36 of a piston 37 operable in a pressure-fluid operated cylinder 38, suitably mounted on brackets 39 extended from the support 18, sufficient space being provided between the plunger 35 and cylinder 33 in the retracted position thereof shown in Figure 2 to permit ready access for loading the bore 34 with a slug of tread stock 40. The inner ends of the bores 34 communicate with extrusion orifices or slits 41 in the mold, these orifices being shown formed by mating recess portions in the parting line surfaces of the mold sections, although in the construction shown the slits might well be provided wholly in either mold section. A tight seal against outward flow of rubber may be provided between the upper halves of cylinders 33, at the inner ends thereof, and the peripheral face of the top mold section, by machine finishing the mating interengaging surfaces, which also serve as means for orienting the top mold section on the bottom mold section.

Only suitable clamping means 43, 43 is provided in the mold 17 for clamping the mold sections 15 and 16 together. Rubber tread stock 40, for example, may be maintained in desired soft pliable state to facilitate extrusion thereof through the orifices 41, by circulating hot water or other fluid through chambers 42 in the walls of the cylinders 33.

In use or operation of the apparatus described in Figures 1, 2 and 3, an operator opens the mold 17 by raising the top mold section 15 as described, and places in the bottom mold half 16 a tire T, containing a fluid-pressure expansible bag B of known type, the casing having been previously prepared for retreading or recapping the same by having the old tread rubber buffed or ground down to a substantial depth sufficient to provide a uniformly roughened surface without removing any of the usual reinforcing fabric. The top mold section is then positioned on the lower mold section and clamped thereto by means of the clamps 42.

Next, the operator having placed slugs of vulcanizable rubber 40 in each cylinder 33, applies fluid-pressure in the outer ends of cylinders 38, preferably simultaneously, to urge the plungers 35 into the cylinder bores 34, thereby to force the rubber stock through the orifices 41, until the space 28 between the casing T and the tread portion 27 of the mold is completely filled, vulcanizing heat, supplied in the mold as described, then being effective to vulcanize the extruded tread stock to the casing in known manner.

After a vulcanizing cycle of operation of the mold has been completed it is again opened and the vulcanized tire is removed. As an excess of rubber stock preferably is used to assure complete filling of the annular tread space 28, any such excess rubber is removed before the cylinders 33 are refilled with unvulcanized rubber for a subsequent retreading or recapping cycle of operation.

Referring to the modified form of the invention shown in Figures 4 and 5, a mold 50 including top and bottom mold sections 51 and 52, respectively, is internally substantially the same as the previously described mold 17. Figure 5 illustrates the closed mold containing a tire casing $T_1$ providing an annular space 54 between the casing and the tread forming portion of the mold cavity.

Circumferentially equally spaced on the upper mold section 51, integral with the outer peripheral wall thereof, may be a purality of plungers 55 for sliding reception in chambers 56 of housings 57 which are mounted in association with the lower mold sections to be vertically shiftable toward and from the respective plungers. Accordingly, the housings are open at the top and at the sides thereof toward the mold, and are provided at opposite sides with flanges 58, 58 which are in vertically sliding dovetailed connection with spaced guide portions 59, 59 on the outer peripheral wall of the lower mold section. Thus, in the closed condition of the mold, as shown, each housing with its plunger and the lower mold section combine to provide the closed chamber 56 communicating with the inner tread space 54 of the mold through a narrow extrusion orifice 60.

Each housing 57 may be urged upwardly of its plunger 55 by means of a piston 61 fixed on a shaft 62 constituting a downward extension of the housing, the piston being pressure-fluid operated in a cylinder 63 mounted on a support 64 on the lower mold section 52. Suitable heating means 65 may be provided in each housing for maintaining tread stock 66, such as unvulcanized rubber or synthetic rubber, in plastic condition.

Rubber stock is easily placed in chamber 56 while the top mold section is removed, although by slight modification increasing the travel of the housings 57 the rubber stock could be supplied thereto after the mold is closed. After clamping the mold closed, as before, the cylinders 63 may be operated in unison to urge housings 57 upwardly of the relatively fixed plungers 55, thereby to force slugs of rubber 66 in the chambers through the respective orifices 60, until the tread space 54 is completely filled. Operation of this form of the invention is otherwise as previously described.

In Figures 6 and 7 there is shown another form of the invention, wherein a single annular plunger 55a fixed on a top mold section 51a is received in an annular chamber 56a of a ring 57a, the cross-section of the associated parts, including the mold, at a point corresponding to section 5—5 in Figure 4 being otherwise substantially as shown in Figure 5. Any suitable means 43a is contemplated for clamping the mold sections together, after which the ring 57a is urged upwardly by suitable power means, such as the cylinders 63 (Figure 5), to force plastic tread stock 66a, previously placed in the annular chamber 56a, through a plurality of extrusion orifices 60a in the mold wall, communicating with the mold cavity. The stock 66a for this purpose may be in any suitable form, such as in large or small lumps or in cut or extruded strips. Instead of a purality of such orifices a single, narrow orifice may be provided completely around the mold.

The vulcanizing cycle of operation and the results attained may otherwise be substantially as described in connection with the various other forms of the invention.

Modification of this invention may be resorted to without departing from the spirit thereof or the scope of the appended claims.

What is claimed is:

1. Apparatus for applying plastic tread material to a tire carcass, comprising separable registering cavity mold sections having non-skid tread-forming portions therein, means for positively orienting a tire carcass in mold cavity to have a space of predetermined depth between said tread-forming portions and the outer peripheral portions of the tire carcass, at least one orifice being provided in the mold to communicate with said space, and pressure means for forcing plastic tread stock through each said orifice to fill said space, said pressure means including a housing relatively shiftably mounted in association with one said mold section and having therein a chamber provided with an opening presented exteriorly of the same, a plunger relatively fixed on the other said mold section and receivable in said chamber through the opening thereof, and power means for relatively shifting said housing toward said plunger to receive the plunger within the housing and thereby force plastic stock in the chamber through the communicating orifice.

2. Apparatus for applying plastic tread material to a tire carcass, comprising separable registering cavity mold sections having non-skid tread-forming portions therein, means for positively orienting a tire carcass in mold cavity to have a space of predetermined depth between said tread-forming portions and the outer peripheral portions of the tire carcass, at least one orifice being provided in the mold to communicate with said space, and pressure means for forcing plastic tread stock through each said orifice to fill said space, said pressure means including a plurality of housings shiftably mounted on one said mold section and having therein chambers provided with openings presented exteriorly of the same, a plurality of plungers relatively fixed on the other said mold section to be in alignment with the chamber openings and receivable in corresponding said chambers, and power means for relatively shifting said aligned housings and plungers to receive the plungers within the respective housings and thereby force plastic stock therein through said orifices.

3. Apparatus for applying plastic tread material to a tire carcass, comprising separable registering cavity mold sections having mating annular non-skid tread-forming portions therein, means for centering a tire carcass in the mold to have an annular space of substantially uniform depth between the tread-forming portion thereof and the outer peripheral portion of the tire carcass, a plurality of orifices being provided in the mold communicating with said annular space, and pressure means for forcing plastic tread stock through said orifices to fill said annular space, said pressure means including a plurality of housings shiftably mounted on one said mold section and having therein chambers provided with openings presented exteriorly of the same, a plurality of plungers relatively fixed on the other said mold section to be in alignment with the chamber openings and receivable in corresponding said chambers, and power means for relatively shifting said aligned housings toward said plungers to receive the plungers within the respective housings and thereby force plastic stock therein through said orifices.

4. Apparatus for applying plastic tread material to a tire carcass, comprising separable registering cavity mold sections having mating annular non-skid tread-forming portions therein, means for centering a tire carcass in the mold to have an annular space of substantially uniform depth between the tread-forming portion thereof and the outer peripheral portion of the tire carcass, at least one orifice being provided in the mold communicating with said annular space, and pressure means for forcing plastic tread stock through said orifice or orifices to fill said annular space, said pressure means including a ring surrounding and axially shiftable with respect to one of said mold sections and defining with outer peripheral portions thereof an annular chamber opening axially toward the other mold section, an annular plunger relatively fixed on said other mold section and receivable in said annular chamber, and power means for relatively shifting said ring toward said plunger to force plastic stock in the chamber through said at least one communicating orifice.

5. Apparatus for applying plastic tread material to a tire carcass, comprising separable registering cavity mold sections having mating annular non-skid tread-forming portions therein, means for centering a tire carcass in the mold to have an annular space of substantially uniform depth between the tread-forming portion thereof and the outer peripheral portion of the tire carcass, at least one orifice being provided in the mold communicating with said annular space, and pressure means for forcing plastic tread stock through said orifice or orifices to fill said annular space, said pressure means including a ring surrounding and axially shiftable with respect to one of said mold sections and defining with outer peripheral portions thereof an annular chamber opening axially toward the other mold section, an annular plunger relatively fixed on said other mold section and receivable in said annular chamber, and power means for relatively shifting said ring toward said plunger to force plastic stock in the chamber through said at least one communicating orifice, said centering means including annular shoulders in the respective mold sections for snug reception of the annular bead portions of the tire carcass.

6. Apparatus for applying plastic tread material to a tire carcass, comprising separable registering cavity mold sections having mating annular non-skid tread-forming portions therein, means for centering a tire carcass in the mold to have an annular space of substantially uniform depth between the tread-forming portion thereof and the outer peripheral portion of the tire carcass, at least one orifice being provided in the mold communicating with said annular space, and pressure means for forcing plastic tread stock through said orifice to fill said annular space, said pressure means including a ring surrounding and axially shiftable with respect to one of said mold sections and defining with outer peripheral portions thereof an annular chamber opening axially toward the other mold section, an annular plunger relatively fixed on said other mold section and receivable in said annular chamber, and power means for relatively shifting said ring toward said plunger to force plastic stock in the chamber through said communicating orifice, means being provided for heating said annular chamber for softening said plastic stock therein.

7. Apparatus for applying plastic tread material to a tire carcass, comprising separable registering cavity mold sections having mating annular non-skid tread-forming portions therein, means for centering a tire carcass in the mold to have an annular space of substantially uniform depth between the tread-forming portion thereof and the outer peripheral portion of the tire carcass, at least one orifice being provided in the mold communicating with said annular space, and pressure means for forcing plastic tread stock through said orifice to fill said annular space, said pressure means including a ring surrounding and axially shiftable with respect to one of said mold sections and defining with outer peripheral portions thereof an annular chamber opening axially toward the other mold section, an annular plunger relatively fixed on said other mold section and receivable in said annular chamber, and power means for relatively shifting said ring toward said plunger to force plastic stock in the chamber through said communicating orifice, said power means including cylinder means and pressure-fluid operated piston means therein carrying said ring.

8. Apparatus for applying plastic tread material to a tire carcass, comprising separable registering cavity mold sections having mating annular non-skid tread-forming portions therein, means for centering a tire carcass in the mold to have an annular space of substantially uniform depth between the tread-forming portion thereof and the outer peripheral portion of the tire carcass, at least one orifice being provided in the mold communicating with said annular space, and pressure means for forcing plastic tread stock through said orifice to fill said annular space, said pressure means including a ring surrounding and axially shiftable with respect to one of said mold sections and defining with outer peripheral portions thereof an annular chamber opening axially toward the other mold section, an annular plunger relatively fixed on said other mold section and receivable in said annular chamber, and power means for relatively shifting said ring toward said plunger to force plastic stock in the chamber through said communicating orifice, said power means including cylinder means and pressure-fluid operated piston means therein carrying said ring, means being provided for heating said annular chamber for softening said plastic stock therein.

9. Apparatus for applying plastic tread material to a tire casing having spaced annular bead portions, comprising a mold including relatively fixed and relatively movable mating cavity mold parts, the mold cavity having annular non-skid tread-forming portions in corresponding radially outer wall portions of the mold parts joined at mating parting surfaces of the same, a collapsible core for reception in the casing, means for centering the tire casing and core in the mold cavity to have an annular space of substantially uniform depths between said annular tread-forming portions of the mold parts and the outer peripheral portion of the tire casing, mating recess portions being provided in said mating parting surfaces of said outer wall portions defining inlet means communicating with said annular space and having inlet ends presented outwardly of the mold, housing means including at least one housing part mounted on said mold, said at least one housing part and cooperating portions of said mold sections defining at least one pressure chamber communicating with said annular space directly through said inlet means and having an outwardly presented material-loading opening, said housing means also having at least one plunger means for reception in a corresponding said pressure chamber through said material-loading opening, said plunger means and housing part being relatively reciprocable, and power means for relatively reciprocating said housing part and plunger means to pressurize plastic tread material previously loaded in said chamber and thereby to force the material through said inlet means into said annular space for filling the same.

10. Apparatus as set forth in claim 9, each said housing means including a plurality of said pressure chambers peripherally spaced around the mold, a said plunger means being provided for each said chamber and being mounted to be reciprocable into and out of the same through the material-loading opening thereof from a point outwardly of the opening, thereby permitting substantially unobstructed loading access to the respective said chambers.

11. Apparatus as set forth in claim 10, said plastic tread material being heat softenable, and means being provided for heating said chambers for softening the material received therein.

12. Apparatus as set forth in claim 9, each said housing means including a plurality of said pressure chambers peripherally spaced around the mold, a said plunger means being provided for each said chamber and being mounted to be reciprocable into and out of the same through the material-loading opening thereof from a point outwardly of the opening, thereby permitting substantially unobstructed loading access to the respective said chambers, said power means including a plurality of cylinders mounted opposite to the respective said housings, pistons reciprocable in said cylinders and each carrying a said plunger, and fluid-pressure means for reciprocating said pistons.

References Cited in the file of this patent

UNITED STATES PATENTS

| | | |
|---|---|---|
| 696,352 | Richards | Mar. 25, 1902 |
| 791,648 | Richards | June 6, 1905 |
| 2,031,786 | Oldham | Feb. 25, 1936 |
| 2,043,584 | Husted | June 9, 1936 |
| 2,072,349 | Wayne | Mar. 2, 1937 |
| 2,199,144 | Tegarty | Apr. 30, 1940 |
| 2,254,233 | Meyer | Sept. 2, 1941 |
| 2,422,266 | Steinke | June 17, 1947 |
| 2,476,884 | Maynard | July 19, 1949 |
| 2,569,935 | Leguillon et al. | Oct. 3, 1951 |
| 2,615,203 | Du Pree | Oct. 28, 1952 |